United States Patent
Li et al.

(10) Patent No.: US 9,151,685 B2
(45) Date of Patent: Oct. 6, 2015

(54) METHOD AND APPARATUS TO DETERMINE TORQUE IN A POWERTRAIN SYSTEM

(75) Inventors: Dongxu Li, Troy, MI (US); Graeme Whyte, Arlington Heights, IL (US); Robert J. Horner, Dexter, MI (US); Jerry Paul Sagady, Fenton, MI (US); Amin Abboud, Livonia, MI (US)

(73) Assignees: GM Global Technology Operations LLC, Detroit, MI (US); Continental Automotive Systems, Inc., Auburn Hills, MI (US)

( * ) Notice: Subject to any disclaimer, the term of this patent is extended or adjusted under 35 U.S.C. 154(b) by 253 days.

(21) Appl. No.: 13/585,988

(22) Filed: Aug. 15, 2012

(65) Prior Publication Data

US 2013/0218426 A1     Aug. 22, 2013

Related U.S. Application Data

(60) Provisional application No. 61/529,266, filed on Aug. 31, 2011.

(51) Int. Cl.
  *G06F 7/00*     (2006.01)
  *G01L 3/02*     (2006.01)
  *G01L 3/10*     (2006.01)

(52) U.S. Cl.
  CPC .. *G01L 3/02* (2013.01); *G01L 3/101* (2013.01)

(58) Field of Classification Search
  CPC ........ F16H 1/061; F16H 48/08; B60W 10/06; B60W 2510/0638; F16D 48/066; F16D 2048/0203
  USPC ........ 701/51, 55, 67, 93, 22, 69, 70; 180/248, 180/197, 250, 65.6; 192/35, 84.93, 218, 192/54.52; 475/198, 86, 249, 149, 5
  See application file for complete search history.

(56) References Cited

U.S. PATENT DOCUMENTS

| | | | | |
|---|---|---|---|---|
| 4,720,793 A | * | 1/1988 | Watanabe et al. | 701/54 |
| 5,559,705 A | * | 9/1996 | McClish et al. | 701/110 |
| 5,636,121 A | * | 6/1997 | Tsuyama et al. | 701/70 |
| 6,199,005 B1 | * | 3/2001 | Iwata | 701/87 |
| 6,306,062 B1 | * | 10/2001 | Toukura et al. | 477/107 |
| 6,418,365 B1 | * | 7/2002 | Loffler et al. | 701/51 |
| 6,487,486 B1 | * | 11/2002 | Anderson | 701/69 |
| 6,513,611 B2 | * | 2/2003 | Ito et al. | 180/179 |
| 7,104,119 B1 | * | 9/2006 | Trapasso et al. | 73/114.26 |
| 7,110,869 B2 | * | 9/2006 | Tao et al. | 701/31.1 |

(Continued)

OTHER PUBLICATIONS

U.S. Appl. No. 13/446,097, filed Apr. 13, 2012, Li, Dongxu.

*Primary Examiner* — Helal A Algahaim
*Assistant Examiner* — Shardul Patel

(57) ABSTRACT

A method for monitoring torque in a gear train includes coincidently determining angles of rotation of first and second rotationally coupled members of the gear train. Each of the members employs a respective rotational position sensor. Each of said angles of rotation are determined based upon times corresponding to a last signal pulse, a next-to-last signal pulse, and a total quantity of signal pulses generated by the respective rotational position sensor during a current sampling interval. A twist angle corresponding to a difference between the angles of rotation of the first and second rotationally coupled members of the gear train is determined, and torque corresponding to the twist angle is calculated.

10 Claims, 3 Drawing Sheets

(56) References Cited

U.S. PATENT DOCUMENTS

| | | |
|---|---|---|
| 7,162,353 B2 * | 1/2007 | Minowa et al. .................. 701/96 |
| 7,359,787 B2 * | 4/2008 | Ono et al. ........................ 701/82 |
| 7,559,259 B2 * | 7/2009 | Fruhwirth et al. ........ 73/862.321 |
| 7,611,441 B2 * | 11/2009 | Cring ............................ 477/174 |
| 2008/0011103 A1 * | 1/2008 | Fruhwirth et al. ........ 73/862.321 |
| 2012/0078475 A1 | 3/2012 | Li et al. |
| 2012/0078476 A1 | 3/2012 | Li et al. |
| 2012/0094800 A1 * | 4/2012 | Suzuki et al. ...................... 477/3 |

\* cited by examiner

METHOD AND APPARATUS TO DETERMINE TORQUE IN A POWERTRAIN SYSTEM

CROSS REFERENCE TO RELATED APPLICATIONS

This application claims the benefit of U.S. Provisional Application No. 61/529,266 filed on Aug. 31, 2011, which is incorporated herein by reference.

TECHNICAL FIELD

This disclosure is related to powertrain systems, and mechanisms for monitoring torque output thereof.

BACKGROUND

The statements in this section merely provide background information related to the present disclosure and may not constitute prior art.

Powertrain systems for vehicles generate and transfer torque to a driveline to propel the vehicle in response to an operator command. Torque is generated by an internal combustion engine and non-combustion torque machine(s) in hybrid powertrain systems. Torque information can be used in a variety of powertrain control schemes, including, e.g., clutch fill-time detection, engine torque estimation, transmission shift smoothing, and driveline torque management to manage vehicle drivability. During acceleration and deceleration events, vehicle occupants can detect changes in torque, including during transmission shifts. Control schemes that control transmission shifting can be used to minimize torque disturbances. A closed-loop control scheme can be used during transmission shifting to estimate driveline torque based upon expected torque from the engine at a given engine speed. However, estimated torque may not be determined with sufficient precision or response timeliness to permit effective powertrain control. Known dedicated torque sensors detect actual amount of torque, which may be employed in a control scheme to determine a transmission shift schedule. However, dedicated torque sensors increase cost, part content, wiring harness complexity, and mass, and may affect vehicle reliability.

SUMMARY

A method for monitoring torque in a gear train includes coincidentally determining angles of rotation of first and second rotationally coupled members of the gear train. Each of the members employs a respective rotational position sensor. Each of said angles of rotation are determined based upon times corresponding to a last signal pulse, a next-to-last signal pulse, and a total quantity of signal pulses generated by the respective rotational position sensor during a current sampling interval. A twist angle corresponding to a difference between the angles of rotation of the first and second rotationally coupled members of the gear train is determined, and torque corresponding to the twist angle is calculated.

BRIEF DESCRIPTION OF THE DRAWINGS

One or more embodiments will now be described, by way of example, with reference to the accompanying drawings, in which.

DETAILED DESCRIPTION

Figure 1:
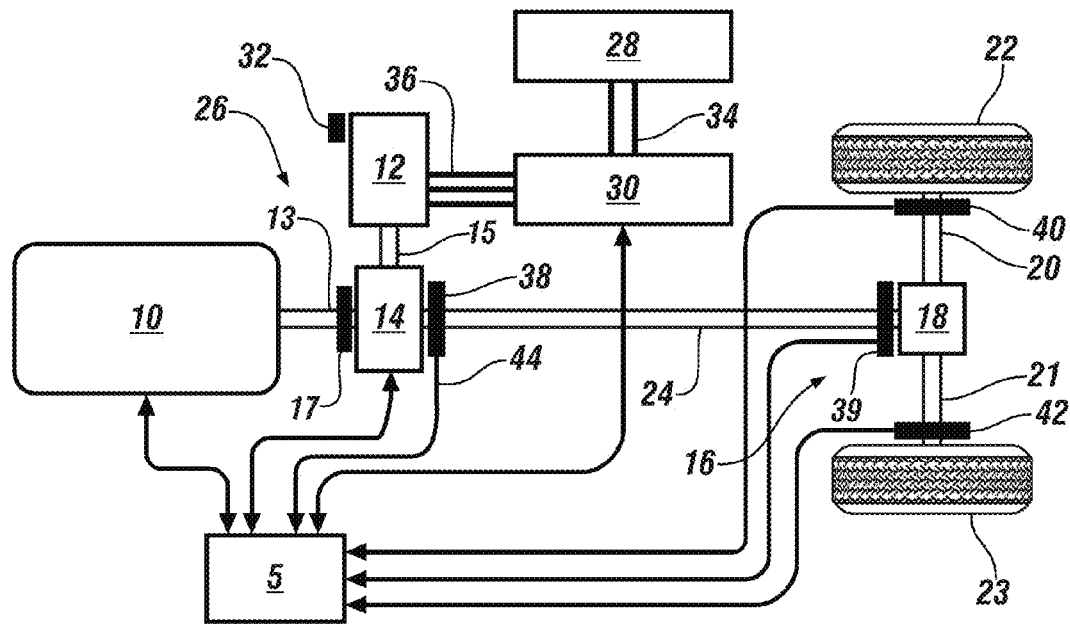
FIG. 1 illustrates a vehicle hybrid powertrain system including an internal combustion engine and torque machine, in accordance with the present disclosure.

Referring now to the drawings, wherein the showings are for the purpose of illustrating certain exemplary embodiments only and not for the purpose of limiting the same, FIG. 1 schematically shows a hybrid powertrain system 26 including an internal combustion engine 10, transmission 14 and torque machine 12, with operation monitored and controlled by control module 5. The engine 10 and torque machine 12 are coupled to the transmission device 14 to transmit tractive torque to a driveline 16 to propel a vehicle. The engine 10, torque machine 12, transmission device 14, and driveline 16 illustrate a gear train. Other powertrain systems, including other hybrid powertrain configurations and non-hybrid powertrain configurations are contemplated. The driveline 16 includes a differential gear device 18 that mechanically couples to a first half-shaft 20 and a second half-shaft 21 that mechanically couples to a first drive wheel 22 and a second drive wheel 23 in one embodiment. The differential gear device 18 is coupled to an output member 24 of the hybrid powertrain system 26. The driveline 16 transfers tractive power between the transmission 14 and a road surface via the first and second drive wheels 22, 23. The terms "shaft" and "member" are used interchangeably throughout the disclosure to refer to rotating torque-transfer elements.

The engine 10 can be any suitable heat combustion device that converts fuel to mechanical power. The torque machine 12 can be any suitable non-combustion torque-producing machine that converts stored energy to mechanical power and converts mechanical power to storable energy that can be stored in an energy storage device (ESD) 28. The rotor for the torque machine 12 transfers torque through the transmission 14 to the driveline 16 via shaft 15. The engine 10 and the torque machine 12 generate and transfer torque to the driveline 16 to provide tractive torque through the first and second drive wheels 22, 23. The transferred mechanical power can be in the form of tractive torque for vehicle propulsion, and in the form of reactive torque for vehicle braking associated with regenerative braking functionality. Other hybrid configurations, e.g., series hybrid, parallel hybrid, or compound hybrid drive, or non-hybrid configurations, or electric drive vehicles may be similarly employed. The input torque from the engine 10 and the motor torque from the torque machine 12 are generated as a result of energy conversion from fuel and potential energy stored within the ESD 28, respectively.

In one embodiment the torque machine 12 is an electrical motor/generator employing a three-phase AC machine, including a stator, a rotor, and a resolver 32, and the ESD 28 is a part of a high-voltage electric system that electrically connects to a power inverter control module (PIM) 30 electrically connected to the torque machine 12. The motor stator for torque machine 12 is grounded to an outer portion of a transmission case, and includes a stator core with coiled electrical windings extending therefrom. The ESD 28 couples to the PIM 30 via DC transfer conductors 34. The transfer conductors 34 provide switchable electric current flow between the ESD 28 and the PIM 30. The PIM 30 transmits electrical power to and from the torque machine 12 by transfer conductors 36 to meet the torque commands in response to a motor torque request. Electrical current is transmitted to and from the ESD 28 in accordance with whether the ESD 28 is being charged or discharged.

A first rotational position sensor (first sensor) 17 is configured to monitor rotational position of an input member 13 rotatably coupled between the engine 10 and the transmission 14. A second rotational position sensor (second sensor) 38 is configured to monitor rotational position of the output member 24, preferably immediately adjacent the transmission 14. In one embodiment, a first wheel sensor 40 is configured to monitor rotational position of one of the half-shafts 20, 21, and is located distally relative to the second sensor 38. The aforementioned rotational position sensors are configured to monitor rotationally coupled members of the hybrid powertrain system 26 and driveline 16.

The output member 24 rotationally couples to the half-shafts 20, 21 via the differential 18, meaning that rotation of one of the members causes a corresponding rotation of the second member. Thus, the signal output from the second sensor 38 correlates to the signal output of the first wheel sensor 40 due to the rotational coupling of the output member 24 and the half-shaft 20. It is appreciated that there may be intervening mechanical couplings in the form of planetary gears, differential gears, and other mechanisms that affect ratios of input and output speeds and relative positions. In another embodiment, a second wheel sensor 42 is configured to monitor rotational position of another of the half-shafts 20, 21. The second sensor 38 rotationally couples to the second wheel sensor 42 via the output member 24 and differential 18. The first and second wheel sensors 40, 42 are preferably positioned adjacent to corresponding first and second drive wheels 22, 23. Alternatively or in addition, another rotational sensor 39 is configured on the output member 24 distal to the second sensor 38, e.g., adjacent the differential 18. When the hybrid powertrain system 26 is operating in an electric vehicle mode, i.e., with the engine 10 off and not spinning, the resolver 32 can provide the rotational information analogous to that provided by the first sensor 17. Thus, in each embodiment the first sensor 17 rotationally couples to at least one additional distally-positioned rotational sensor. In each of the embodiments, the selected ones of the first sensor 17, second sensor 38, resolver 32, first wheel sensor 40, second wheel sensor 42, and sensor 39 are signally connected to the control module 5 via data links 44 that can include an electric cable, a hardware interface device, a communications bus, or another suitable communications link. One of the data links 44 is shown connected between the second sensor 38 and the control module 5.

The first sensor 17, the second sensor 38 and the first and second wheel sensors 40, 42 are rotational position sensors from which rotational speeds can be derived. Signals from the rotational sensors are substantially periodic during constant or steady-state rotation of the driveline. An exemplary rotational position sensor includes a toothed gear preferably fabricated from a ferromagnetic material secured to a rotating element, e.g., a rotating shaft, which passes by a stationary Hall-effect sensor. Each tooth that passes the Hall-effect sensor produces an electrical current that is analyzed in terms of amplitude, duration, and dwell. A full signal corresponds to a tooth time period (i.e., from the beginning or ending of a first tooth to a corresponding beginning or ending of a second, adjacent tooth), or tooth rotation. A partial signal corresponds to a portion of a tooth time period, or a partial tooth rotation. Since the quantity of teeth on the toothed gear is known, a speed can be calculated by counting full and partial signals produced within a preset sample window. Other known rotational position sensors that may be employed include a bearingless wheelset sensor, a wheelset pulse generator, and an optical wheel rotational position sensor that produces periodic signals.

Control module, module, controller, control unit, processor and similar terms mean any suitable one or various combinations of one or more of Application Specific Integrated Circuit (ASIC), electronic circuit(s), central processing unit (s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module 5 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The control module 5 controls operation of the hybrid powertrain system 26 in response to an output torque request using a suitable torque control scheme. The control module 5 controls the engine 10 and the torque machine 12 to produce the output torque request, either individually or in combination. The control module 12 controls the transmission 14 to transmit torque to the driveline 16, including operating the transmission 14 in one of a plurality of fixed-gear ratios or continuously variable ratios to achieve the final output torque request.

Figure 2:
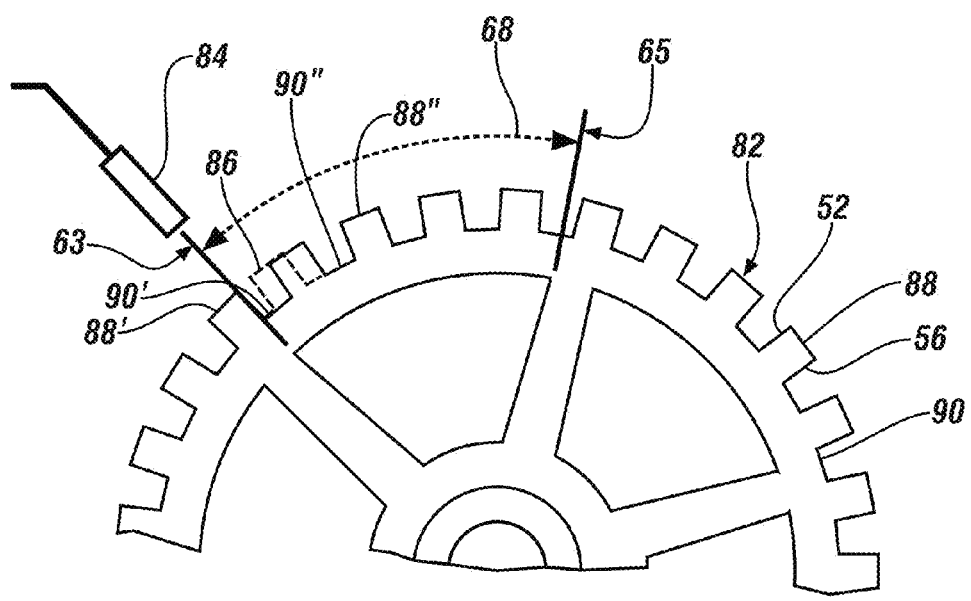
FIG. 2 illustrates the rotational sensor depicting a toothed element and sensor, in accordance with the present disclosure.

FIG. 2 is a partial schematic representation of an embodiment of one of the aforementioned rotational position sensors, i.e., one of the first sensor 17, second sensor 38, the first and second wheel sensors 40 and 42, and resolver 32. A toothed element 82 and sensor 84 are shown. The sensor 84 may be any suitable edge-sensing device, e.g., a magnetoresistive (MR) sensor or a Hall-effect sensor, or another sensing system without limitation. The toothed element 82 is located on a rotating element, such as the output member 24 and includes a plurality of equidistantly-spaced teeth 88. Each tooth 88 is separated from adjacent teeth by a space 90 and is configured with a nominal rising edge 52 and a nominal falling edge 56 associated with counter-clockwise rotation as shown in FIG. 2. The sensor 84 is located adjacent the toothed element 82 and monitors the individual teeth 88 of the toothed element 82. A sample window 68 is a preset time period during which sensor output signals are captured, and is used to identify an initial angle 63 and a final angle 65. As shown, a number of teeth 88 are detected within the sample window 68 when the toothed element 82 is rotating at a known speed. In one embodiment, the sample window 68 is 25 ms.

A positional identifier 86 is shown within the sample window 68. The positional identifier 86 is one of the teeth 88 that is discernibly different in construction or placement relative to the other teeth 88 on the toothed element 82. The positional identifier 86 may have a shape that is similar to the other teeth 88 and is positioned circumferentially nearer to the preceding tooth 88' and circumferentially further from the following tooth 88" such that the space 90' between preceding tooth 88' and the positional identifier 86 is smaller than the remaining spaces 90 and the space 90" between the positional identifier 86 and following tooth 88" is larger than the remaining spaces 90. The positional identifier 86 may instead be of a different shape, e.g., may be wider or narrower than the remainder of the teeth 88 provided the sensor 84 can detect the different shape associated therewith.

Figure 3:
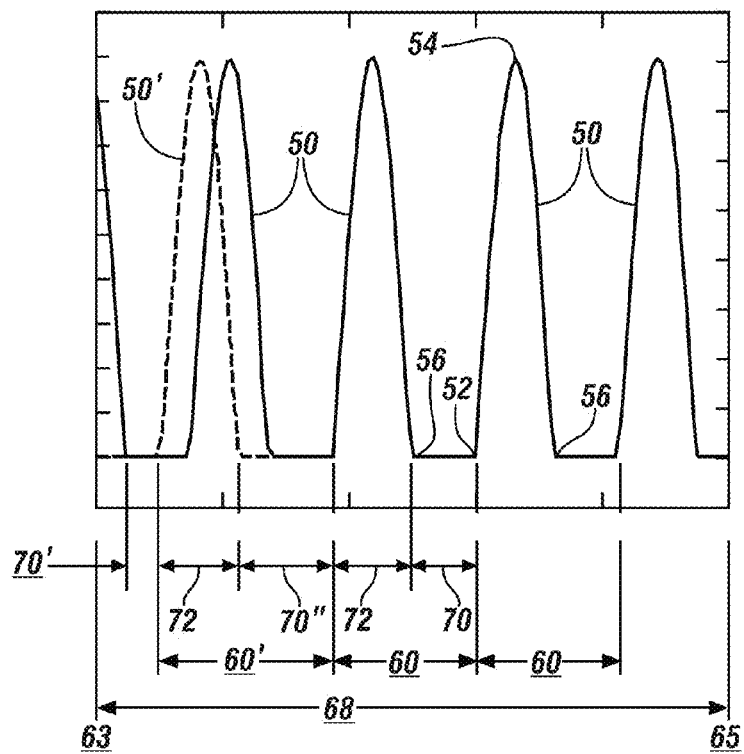
FIG. 3 illustrates data showing sensed tooth detection over a specified time period from a rotational sensor, in accordance with the present disclosure.

FIG. 3 graphically shows exemplary data from one of the rotational sensors associated with rotating members during sample window 68, including the initial angle 63 and the final angle 65. The data corresponds to signal output from the sensor 84 in response to rotation of the toothed wheel 82 described in FIG. 2. An output signal 50 is generated as each tooth 88 passes the sensor 84. Each output signal 50 can be characterized in terms of a starting point 52, a peak 54, an ending point 56, and dwell 70. Signal duration 72 is the elapsed time between the starting point 52 and the ending point 56. Dwell 70 is the elapsed time between the ending point 56 of one output signal 50 and the starting point 52 of an adjacent, subsequent output signal 50. The combined signal duration 72 and dwell 70 form a signal period 60. When the rotating element rotates at a constant speed, a periodic pattern emerges during the sample window 68. When the rotation speed increases, an increase in the number of teeth sensed during the sample window 68 increases. When the rotation speed decreases, the number of teeth sensed during the preset sample window 68 decreases.

The positional identifier 86 produces a signal that is similar in shape to the remainder of the teeth 88 but generates an initial identifier dwell 70' that is shorter in elapsed time than dwell 70. The positional identifier 86 has a sensed profile having an amplitude and signal duration 72 that is similar to the amplitude and signal duration 72 of the remainder of the teeth 88. Likewise, subsequent tooth 88" generates a subsequent identifier dwell 70" following an identifier profile 50' that is longer in elapsed time than dwells 70. The controller 5 is able to identify the change in both initial and subsequent identifier dwells 70', 70", thereby positively locating the positional identifier 86 and therefore the rotational position of the rotating member, e.g., output member 24. The controller 5 calculates a correction factor to adjust for any error that may be introduced through calculation or gear slip as the controller 5 is able to identify an exact rotational position of the toothed element 82. The control module 5 can detect rotational direction of the rotating member, i.e., one of forward or reverse rotation due to the asymmetrical nature of the initial and subsequent identifier dwells 70', 70" associated with the positional identifier 86. A single positional identifier 86 for each toothed element 82 is discussed herein. A plurality of positional identifiers 86 located on a single toothed element 82 is also contemplated.

An angle of rotation $\Theta$ can be determined based on a comparison of data from coincidentally executed sample windows for any two sensors that are employed in monitoring rotationally coupled members. The angle of rotation $\Theta$ is the magnitude of shaft rotation during a sample window as measured in angular degrees or radians. By comparing the angles of rotation $\Theta$ from rotational sensors configured to monitor the rotationally coupled members, e.g., the output sensor 38 and the first wheel sensor 40, a twist angle therebetween can be determined and a related torque value can be calculated.

An angle of rotation $\Theta$ can be calculated by determining phase angles $\emptyset$ for an initial signal and a final signal, i.e., $\emptyset$init and $\emptyset$final respectively, and the number of intermediate signals within the sample window. The initial phase angle $\emptyset$init is determined by knowing a first signal period t1 measured from the beginning of the sample window to the ending point of the first sensed tooth output, a reference full signal period P1, and the total number of teeth Nt on the toothed element. The reference full signal period P1 preferably includes the subsequent or preceding adjacent signal period, e.g., as measured from the starting point of the first full sensed tooth output to the starting point of the next sensed tooth output when no positional identifier is involved. Alternatively, the reference full signal period is determined based upon another temporally close subsequent or preceding signal period. The first signal period t1 may encompass only a portion of a full signal period. The initial phase angle $\emptyset$init is determined as follows.

$$\emptyset_{init} = \left[\frac{t1}{(Nt \cdot P1)}\right] 360 \quad [1]$$

The final phase angle $\emptyset$final is determined by knowing a last signal period t2 measured from starting point of the last sensed tooth output to the end of the sample window, a reference full signal period P2, and the total number of teeth Nt on the rotational sensor. The reference full signal period P2 is preferably the subsequent or preceding adjacent signal period, e.g., as measured from the starting point of the last full sensed tooth output to the starting point of the last sensed tooth output if no positional identifier is included. Alternatively, the reference full signal period P2 is another temporally close subsequent or preceding signal period, or an average of multiple temporally close full signal periods. The last signal period t2 may encompass only a portion of a full signal period. The final phase angle $\theta$final is determined as follows.

$$\emptyset_{final} = \left[\frac{t2}{(Nt \cdot P2)}\right] 360 \quad [2]$$

The overall angle of rotation $\Phi r(i)$ during the sample window can be calculated for the specific sensor as the summation of the initial and final phase angles and an intermediate phase angle in accordance with the following equation:

$$\Phi r(i) = \emptyset init(i) + \emptyset final(i) + \left(\frac{Nw(i)}{Nt}\right) \cdot 360 \quad [3]$$

wherein i is the index of the sample window,
Nw(i) is the number of complete teeth sensed during the sample window i, and $$\left(\frac{Nw(i)}{Nt}\right) \cdot 360$$

is the intermediate phase angle.

Therefore, an accumulated rotation over time up to the Nth sample window $\Theta r(N)$ can be calculated by the following equation.

$$\Theta r(N) = \Sigma \Phi r(i) \quad [4]$$

Since the initial and final phase angles are estimated using the full signal periods near the limits of the sample window, errors can be introduced since signal periods during the sample window may change due to changes in rotational speeds and/or due to tooth-to-tooth variation as a result of manufacturing variation. Therefore, a constraint is introduced to ensure the sum of a final phase angle of the previous sample window $\emptyset_{final(i)}$ and an initial phase angle of the current sample window $\emptyset_{init(i+1)}$ is equivalent to the angle of rotation of a full signal period as follows.

$$\emptyset_{init(i+1)} + \emptyset_{final(i)} = \frac{360}{Nt} \quad [5]$$

By way of example, the two rotationally coupled rotational sensors can include the first sensor 17 and first wheel sensor 40.

The toothed element of each of the aforementioned rotationally coupled sensors includes a positional identifier, e.g., shown as element 86 in FIG. 2. The positional identifiers of the rotationally coupled sensors are rotationally indexed allowing the control module 5 to have a reference for the relative rotational positions of the respective positional identifiers. Additionally, the control module 5 may have a learning period wherein the control module 5 locates relative positions of the positional identifiers 86 of the rotationally coupled sensors. The control module 5 employs the relative position as a reference in detecting a variation in the rotational position between the two respective positional identifiers 86 and the remaining teeth 88 to make appropriate phase corrections as required. The rotational position variation may be described as a twist angle, which is an angle between the first and second output rotational sensors from which a magnitude of driveline torque being transmitted through the rotating element, e.g., the output member 24, can be determined employing EQ. 6.

Figure 4:
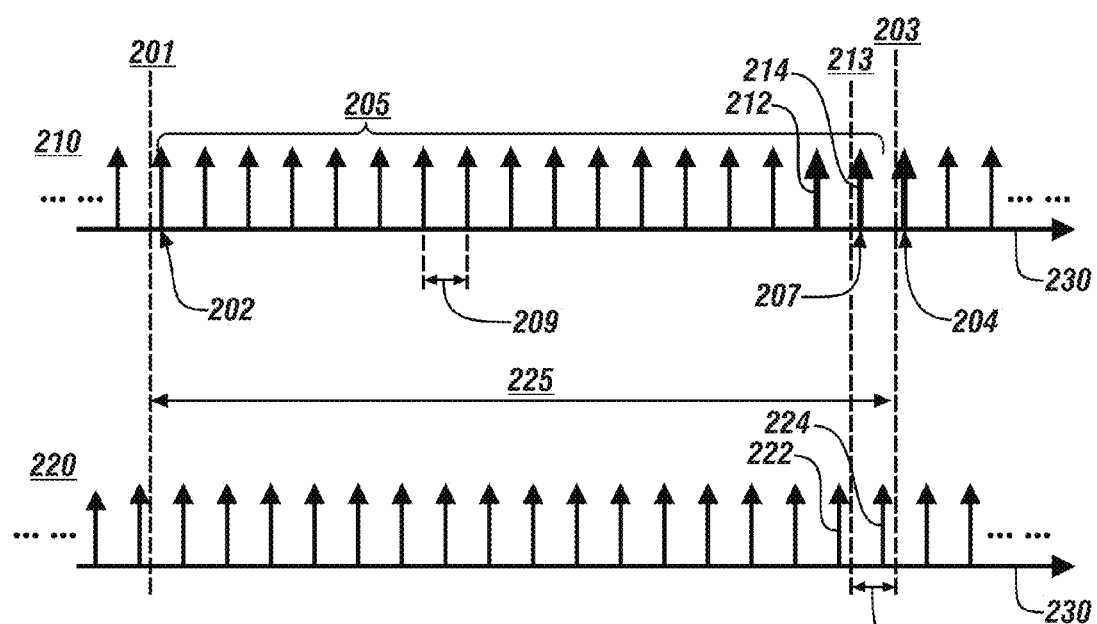
FIG. 4 illustrates simplified first and second signals in relation to elapsed time for rotational sensors associated with rotationally coupled members over a sampling interval, in accordance with the disclosure.

FIG. 4 graphically depicts simplified first and second signals 210 and 220, respectively, plotted in relation to elapsed time 230 from rotationally coupled first and second sensors over a sampling interval 225. For purposes of illustration, the sampling interval 225 begins at a first time point 201 and ends at a second time point 203. The exact time stamp of time points 201 and 203 may be unknown. Thus, the algorithm can be implemented in a non-periodic manner and can initiate at an arbitrary time of request. The sampling interval 225 is analogous to the sample window 68 described with reference to FIG. 3. The depicted first signal 210 and second signal 220 each includes a plurality of signal pulses corresponding to output signals from the rotationally coupled position sensors. Only timestamps of the rising or falling edges are retained here and are represented as impulses for ease of illustration. The timestamps of the first signal 210 are indicated as 202, . . . , 207, wherein N 205 indicates the total quantity of pulses occurring during the sampling interval 225. The pulses correspond to the aforementioned output signals 50 generated as the teeth 88 pass the rotational sensor 84 which is described with reference to FIG. 3.

The first signal 210 depicts data from a first of the rotationally coupled sensors, and the second signal 220 depicts data from a second of the rotationally coupled sensors. Rotational position variation is a twist angle between the first and second rotationally coupled sensors from which a magnitude of torque is determined.

Time stamps of the last two signal pulses 212, 214 of the first signal 210 and time stamps of the last two signal pulses 222, 224 of the second signal 220 occurring during the sampling interval 225 are monitored and recorded. An arbitrary reference time point (T_ref(k)) 213 is selected for all the speed sensors of interest using an arbitrary phase shift 215 from the second time point 203, with the arbitrary reference time point (T_ref(k)) 213 preferably occurring between the last input signal pulse 214 and the next-to-last output signal pulse 222. A first angle of rotation $\Phi_I$ corresponding to the first signal 210 and a corresponding second angle of rotation $\Phi_F$ corresponding to the second signal 220 are determined during each sampling interval 225. A twist angle $\Phi_T$ can be determined as a difference between the first and second angles of rotation, taking into account any intermediate gear ratios (GR) in between, as follows.

$$\Phi_T = \Phi_I - (\Phi_F * GR) \quad [6]$$

The twist angle $\Phi_T$ can be used to calculate transmitted torque, as follows:

$$T = Keq * \Phi_T \quad [7]$$

wherein Keq is an equivalent stiffness coefficient of the intermediate rotating elements between the first and second rotationally coupled sensors. The equivalent stiffness coefficient Keq depends upon the particular driveline configuration and locations of the first and second rotationally coupled sensors.

Figure 5:
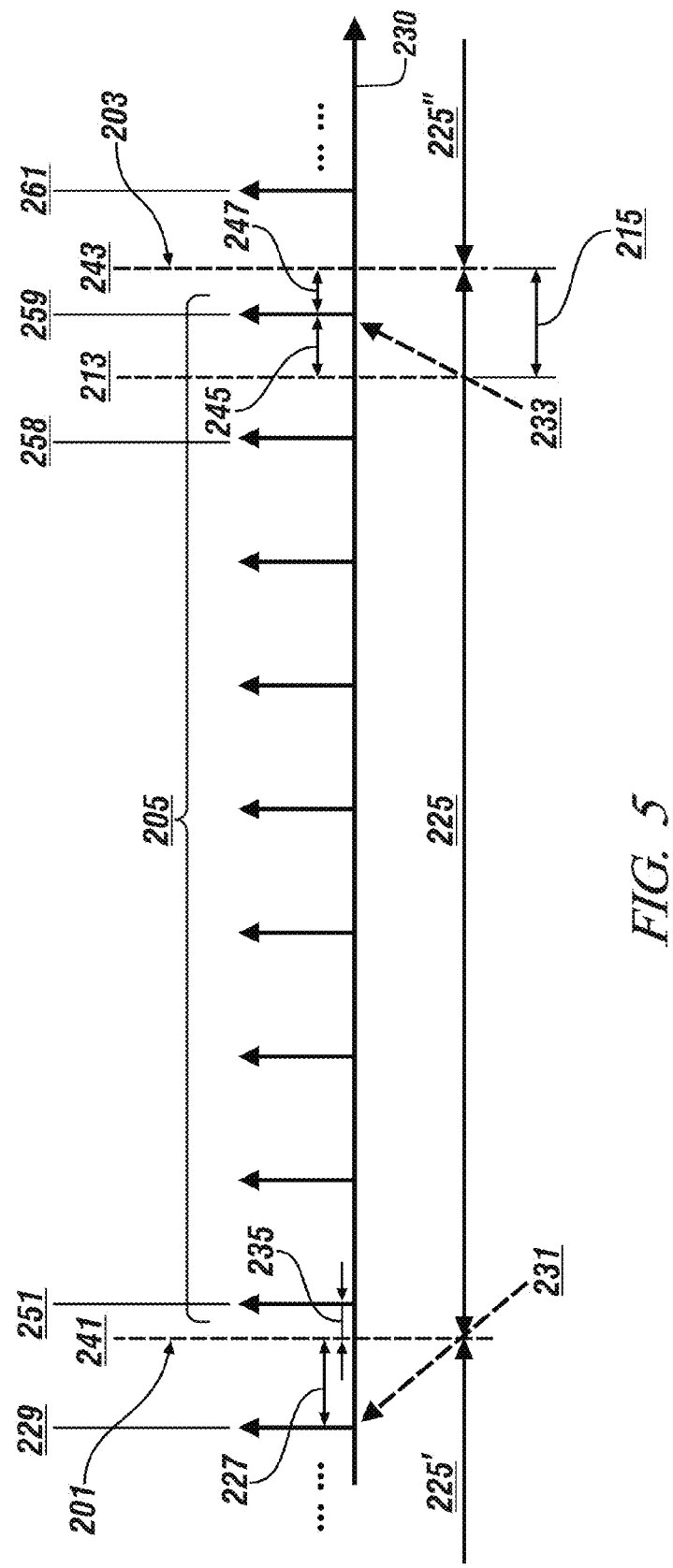
FIG. 5 illustrates one of the first and second signals shown with reference to FIG. 4, and depicts relevant parameters including times and rotational angles corresponding to one of the rotationally coupled members, in accordance with the disclosure.

FIG. 5 graphically shows one of the signals shown with reference to FIG. 4, i.e., one of the first signal 210 and corresponding second signal 220, and depicts relevant parameters including times and rotational angles of the corresponding rotationally coupled member. The signal is depicted in relation to elapsed time 230. The relevant parameters including times and rotational angles are employed to calculate to a final angle of rotation of the selected rotationally coupled member. The final angle of rotation of the selected rotationally coupled member corresponds to one of the aforementioned first and second angles of rotation associated with one of the rotationally coupled members, i.e., one of the first angle of rotation $\Phi_I$ corresponding to the first signal 210 and the corresponding second angle of rotation $\Phi_F$ corresponding to the second signal 220 that are employed in EQ. 6 to calculate the twist. When the first and second angles of rotation are calculated, they may be employed in EQ. 7 to calculate torque in the gear train transferred between the first and second rotationally coupled members.

The parameters associated with the signal include the following:

Interval(k) 225, which is the sampling interval of interest;

Interval(k−1) 225', which is a previous sampling interval of interest;

Interval(k+1) 225", which is a subsequent sampling interval of interest;

T_sample(k−1) 201, which is an initial time point indicating a beginning of the sampling interval of interest Interval(k) 225, and also indicating an end of a previous sampling interval Interval(k−1) 225;

$\Phi_{K-1}$ 241, which is an initial angle of rotation of the rotating member of interest that time-corresponds to time point T_sample(k−1) 201 or T_ref(k−1);

T_sample(k) 203, which is a time point indicating an end of the sampling interval of interest Interval(k) 225;

$\Phi_K$ 243, which is a final angle of rotation of the shaft of interest that time-corresponds to time point T_sample(k) 203;

N(k) 205, which indicates the total quantity of signal pulses occurring during the sampling interval Interval(k) 225, with nine signal pulses as shown;

T_1(k) 251, which is the first output signal pulse;

T_8(k) 258, which is the next-to-last output signal pulse;

T_9(k) 259, which is the last output signal pulse;

T_1(k+1) 261, which is the first output signal pulse of Interval(k+1);

T_ref(k) 213, which is the arbitrary reference time point that is phase-shifted from $\Phi_K$ 243 (the final angle of rotation of the shaft of interest that time-corresponds to time point T_sample(k) 203);

$\Phi_{Last}$ 233, which is an accumulated angle of rotation of the rotating member of interest corresponding to the last output signal pulse, i.e., T_9(k) 259;

$\Phi_{Last}$(k-1) 231, which is an accumulated angle of rotation of the shaft of interest corresponding to the last output signal pulse of Interval(k-1) 225', i.e., T_n(k-1) 229;

$\eta_I$(k) 235, which is the fraction of the partial tooth rotation during the sampling interval 225 between T_sample(k-1) 201 and T_1(k) 251;

$\eta_F$(k) 247, which is the fraction of the partial tooth rotation during the interval between T_9(k) 259 and the end of the sampling interval 225, indicated at T_sample(k) 203;

$\eta_F'$ 245, which is the fraction of the partial tooth rotation during the interval between the arbitrary reference time point T_ref(k) 213 and T_9(k) 259; and $\eta_F$(k-1) 227, which is a partial angle of rotation between T_sample(k-1) 201 and the last output signal pulse T_N(k-1) 229 of the previous sampling interval Interval(k-1) 225', which is determined during the previous cycle.

The final angle of rotation of the shaft of interest that time-corresponds to time point T_sample(k) 203, i.e., $\Phi_K$ 243 may be determined for each of the first signal 210 and the corresponding second signal 220.

The foregoing analysis is employed using the first signal 210 to determine the first angle of rotation $\Phi_I$ for use in EQ. 6, above. Similarly, the foregoing analysis is employed using the second signal 220 to determine the second angle of rotation $\Phi_F$ for use in EQ. 6, above.

A first method of determining the angle of rotation of the rotating member of interest that time-corresponds to time point T_sample(k), i.e., $\Phi_K$ includes executing the following equations, described with reference to the parameters of FIG. 5:

$$\eta_I(k) = 1 - \eta_F(k-1) \quad [8]$$

$$\eta_F(k) = \frac{T\_sample(k) - T\_9(k)}{T\_9(k) - T\_8(k)} \quad [9]$$

$$\Phi_K = \Phi_{K-1} + [(\eta_I(k) + \eta_F(k) + N(k) - 1)/N_T] \quad [10]$$

wherein $N_T$ is a total quantity of teeth on the associated toothed element 82, T_9(k) 259 and T_8(k) 258 correspond to the last output signal pulse and the next-to-last output signal pulse, and N(k) 205 is the number of pulses sensed during the sampling interval 225.

EQS. 8, 9, and 10 are employed in calculating both the first angle of rotation $\Phi_I$ and the second angle of rotation $\Phi_F$. Thus, the information needed to execute this calculation includes T_sample(k) 203, T_9(k) 259, T_8(k) 258, and N(k) 205.

A second method of determining the final angle of rotation of the shaft of interest that time-corresponds to time point T_sample(k), i.e., $\Phi_K$ includes executing the following equations, described with reference to the parameters of FIG. 5:

$$\eta_I(k) = 1 - \eta_F(k-1) \quad [11]$$

$$\eta_F(k) = \frac{T\_sample(k) - T\_9(k)}{T\_1(k+1) - T\_9(k)} \quad [12]$$

$$\Phi_K = \Phi_{K-1} + [(\eta_I(k) + \eta_F(k) + N(k) - 1)/N_T] \quad [13]$$

wherein $N_T$ is a total quantity of teeth on the associated toothed element 82, T_1(k) and T_9(k) corresponds to the first and the last output signal pulse, and N(k) is the number of pulses sensed during the interval (k).

EQS. 11, 12, and 13 are employed in calculating the first angle of rotation $\Phi_I$ and the second angle of rotation $\Phi_F$. Thus, the information needed to execute this calculation includes T_sample(k), T_1(k), T_9(k), and N(k). The second rotational calculation involves one-loop time delay because the first edge time from the next sampling time (T_1(k+1)) interval is needed.

A third method of determining the final angle of rotation of the rotating member of interest that time-corresponds to time point T_ref(k), i.e., $\Phi_K$ includes executing the following equations, described with reference to the parameters of FIG. 5:

$$\eta_F'(k) = \frac{T\_9(k) - T\_ref}{T\_9(k) - T\_8(k)} \quad [14]$$

$$\Phi_{Last}(k) = \Phi_{Last}(k-1) + N(k)/N_T \quad [15]$$

$$\Phi_K = \Phi_{Last}(k) - \eta_F'(k)/N_T \quad [16]$$

wherein $N_T$ is a total quantity of teeth on the associated toothed element 82, T_9(k) and T_8(k) correspond to the last output signal pulse and the next-to-last output signal pulse during the interval (k), T_ref(k) is the arbitrarily selected shifted reference time to all the speed sensors of interest, and N(k) 205 is the number of pulses sensed during the interval (k).

Thus, the information needed to execute this calculation includes T_9(k), T_8(k), and N(k) 205. The reference time point (T_ref(k)) is preferably chosen in the interval between last two pulses (T_8(k) and T_9(k)) for all the speed sensors of interest, including T_8(k) and T_9(k). Other selections are possible, and if it is chosen out of the interval, the fraction of partial tooth rotation $\eta_F'$ can be updated accordingly. Compared to the second method, the third rotational calculation has no time delay. The loop-time for torque calculation (based on T_ref(k)) is not exact, with variation due to phase shift. EQS. 14, 15, and 16 are employed in calculating both the first angle of rotation $\Phi_I$ and the second angle of rotation $\Phi_F$.

The first angle of rotation $\Phi_I$ and the second angle of rotation $\Phi_F$ are employed to calculate relative twist angle $\Phi_T$ to determine relative torque T using EQS. 6 and 7, which are repeated herein for ease of reference.

$$\Phi_T = \Phi_I - (\Phi_F * GR) \quad [6]$$

The twist angle $\Phi_T$ can be used to calculate relative transmitted torque, as follows.

$$T = Keq * \Phi_T \quad [7]$$

In this manner, torque can be calculated by comparing rotational angles at different mechanically coupled locations in the gear train, e.g., an input and an output of the transmission, with the rotational angles determined from rotational sensors positioned at appropriate locations, and the rotational sensors are preferably employed for other purposes. Rotational angle is calculated by tracking quantity of pulses generated by a speed sensor that pass over sensor teeth during a certain sampling interval. The control module 5 executes an algorithm to determine torque that operates in accordance with the above description and runs with a fixed loop cycle time or a variable loop cycle time. The algorithm monitors and employs the last two pulses during each loop cycle, using the reference time that is arbitrarily determined based upon timestamps associated with the last two output signal pulses from each of the two rotational sensors. Thus, torque can be calculated with a small phase shift within a loop time.

The disclosure has described certain preferred embodiments and modifications thereto. Further modifications and alterations may occur to others upon reading and understanding the specification. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A method for monitoring torque in a gear train, comprising:
   coincidently determining angles of rotation of first and second rotationally coupled members of the gear train, each of said members employing a respective rotational position sensor, including determining each of said angles of rotation based upon times corresponding to a last signal pulse, a next-to-last signal pulse, and a total quantity of signal pulses generated by the respective rotational position sensor during a current sampling interval;
   determining a twist angle corresponding to a difference between the angles of rotation of the first and second rotationally coupled members of the gear train; and
   calculating torque corresponding to the twist angle;
   wherein determining each of said angles of rotation comprises calculating each of said angles of rotation in accordance with the following relationship:

$$\Phi_K = \Phi_{K-1} + [(\eta_I(k) + \eta_F(k) + N(k) - 1)/N_T]$$

wherein
   $\Phi_K$ is the angle of rotation at the end of the current sampling interval;
   $\Phi_{K-1}$ is an angle of rotation at the end of an immediately prior sampling interval;
   $N_T$ is a total quantity of teeth on a toothed element of the respective rotational position sensor;
   $N(k)$ is the total quantity of signal pulses occurring during the current sampling interval;

$$\eta_F(k) = \frac{T\_sample(k) - T\_9(k)}{T\_9(k) - T\_8(k)}$$

represents a fraction of a partial tooth rotation between the last signal pulse during the current sampling interval and the end of the current sampling interval, wherein T_sample(k) is the time at the end of the current sampling interval, $T\_9(k)$ is the time at which the last signal pulse during the current sampling interval occurs, and $T\_8(k)$ is the time at which the next-to-last signal pulse during the current sampling interval occurs; and
   $\eta_I(k) = 1 - \eta_F(k-1)$ represents a fraction of a partial tooth rotation between the beginning of the current sampling interval and a first signal pulse during the current sampling interval, wherein $\eta_F(k-1)$ represents a fraction of a partial tooth rotation between a last signal pulse during the immediately prior sampling interval and the end of the immediately prior sampling interval.

2. A method for monitoring torque in a gear train, comprising:
   coincidently determining angles of rotation of first and second rotationally coupled members of the gear train, each of said members employing a respective rotational position sensor, including determining each of said angles of rotation based upon times corresponding to a last signal pulse, a next-to-last signal pulse, and a total quantity of signal pulses generated by the respective rotational position sensor during a current sampling interval;
   determining a twist angle corresponding to a difference between the angles of rotation of the first and second rotationally coupled members of the gear train; and
   calculating torque corresponding to the twist angle;
   wherein determining each of said angles of rotation comprises calculating each of the angles of rotation in accordance with the following relationship:

$$\Phi_K = \Phi_{K-1} + [(\eta_I(k) + \eta_F(k) + N(k) - 1)/N_T]$$

wherein
   $\Phi_K$ is the angle of rotation at the end of the current sampling interval;
   $\Phi_{K-1}$ is an angle of rotation at the end of an immediately prior sampling interval;
   $N_T$ is a total quantity of teeth on a toothed element of the associated rotational position sensor;
   $N(k)$ is the total quantity of signal pulses occurring during the current sampling interval;

$$\eta_F(k) = \frac{T\_sample(k) - T\_9(k)}{T\_1(k+1) - T\_9(k)}$$

represents a fraction of a partial tooth rotation between the last signal pulse during the current sampling interval and the end of the current sampling interval, wherein T_sample(k) is the time at the end of the current sampling interval, $T\_9(k)$ is the time at which the last signal pulse during the current sampling interval occurs, and $T\_1(k+1)$ is the time at which a first signal pulse during an immediately subsequent sampling interval occurs; and
   $\eta_I(k) = 1 - \eta_F(k-1)$ represents a fraction of a partial tooth rotation between the beginning of the current sampling interval and a first signal pulse during the current sampling interval wherein $\eta_F(k-1)$ represents a fraction of a partial tooth rotation between a last signal pulse during the immediately prior sampling interval and the end of the immediately prior sampling interval.

3. A method for monitoring torque in a gear train, comprising:

coincidently determining angles of rotation of first and second rotationally coupled members of the gear train, each of said members employing a respective rotational position sensor, including determining each of said angles of rotation based upon times corresponding to a last signal pulse, a next-to-last signal pulse, and a total quantity of signal pulses generated by the respective rotational position sensor during a current sampling interval;

determining a twist angle corresponding to a difference between the angles of rotation of the first and second rotationally coupled members of the gear train; and calculating torque corresponding to the twist angle;

wherein determining each of said angles of rotation comprises calculating each of the angles of rotation in accordance with the following relationship:

$$\Phi_K = [\Phi_{Last}(k-1) + N(k)/N_T] + \eta'_F(k)/N_T$$

wherein $\Phi_K$ is the angle of rotation at an arbitrarily chosen reference time within the current sampling interval;

$\Phi_{Last}(k-1)$ is an angle of rotation of a last signal pulse at the end of an immediately prior sampling interval;

$N_T$ is a total quantity of teeth on a toothed element of the respective rotational position sensor;

$N(k)$ is the total quantity of signal pulses occurring during the current sampling interval; and $$\eta'_F(k) = \frac{T\_9(k) - T\_\text{ref}}{T\_9(k) - T\_8(k)}$$

represents a fraction of a partial tooth rotation between a reference time T_ref and the last signal pulse during the current sampling interval, wherein T_9($k$) is the time at which the last signal pulse during the current sampling interval occurs, and T_8($k$) is the time at which the next-to-last signal pulse during the current sampling interval occurs.

4. The method of claim 3, wherein the reference time T_ref is arbitrarily chosen and comprises an arbitrary phase shift occurring between the last signal pulse during the current sampling interval and the next-to-last signal pulse during the current sampling interval.

5. The method of any one of claims 1, 2, 3, or 4, wherein calculating the torque corresponding to the twist angle comprises calculating a driveline torque based upon the twist angle and an equivalent stiffness coefficient for the driveline determined between the rotational position sensors of the first and second rotationally coupled members.

6. A method for monitoring torque in a gear train including first and second rotationally coupled members each employing a respective rotational position sensor, comprising:

determining a first angle of rotation associated with the first member based upon times corresponding to an end of a current sampling interval, a respective last signal pulse during the current sampling interval, a respective next-to-last signal pulse during the current sampling interval, and a respective total quantity of signal pulses generated by the first rotational position sensor during the current sampling interval coincident with determining a second angle of rotation associated with the second member based upon times corresponding to the end of the current sampling interval, a respective last signal pulse during the current sampling interval, a respective next-to-last signal pulse during the current sampling interval, and a respective total quantity of signal pulses generated by the second rotational position sensor during the current sampling interval;

determining a twist angle corresponding to a difference between the first and second angles of rotation; and calculating torque corresponding to the twist angle;

wherein determining the first angle of rotation comprises calculating each of the angles of rotation in accordance with the following relationship:

$$\phi_K = \Phi_{K-1} + [(\eta_I(k) + \eta_F(k) + N(k) - 1)/N_T]$$

wherein $\Phi_K$ is an angle of rotation at the end of the current sampling interval;

$\Phi_{K-1}$ is an angle of rotation at the end of an immediately prior sampling interval;

$N_T$ is a total quantity of teeth on a toothed element of the first rotational position sensor;

$N(k)$ is the total quantity of signal pulses occurring during the current sampling interval;

$$\eta_F(k) = \frac{T\_\text{sample}(k) - T\_9(k)}{T\_9(k) - T\_8(k)}$$

represents a fraction of a partial tooth rotation between the last signal pulse during the current sampling interval and the end of the current sampling interval, wherein T_sample($k$) is the time at the end of the current sampling interval, T_9($k$) is the time at which the last signal pulse during the current sampling interval occurs, and T_8($k$) is the time at which the next-to-last signal pulse during the current sampling interval occurs; and $\eta_I(k) = 1 - \eta_F(k-1)$ and represents a fraction of a partial tooth rotation between the beginning of the current sampling interval and a first signal pulse during the current sampling interval, wherein $\eta_F(k-1)$ represents a fraction of a partial tooth rotation between a last signal pulse during the immediately prior sampling interval and an end of the immediately prior sampling interval.

7. A method for monitoring torque in a gear train including first and second rotationally coupled members each employing a respective rotational position sensor, comprising:

determining a first angle of rotation associated with the first member based upon times corresponding to an end of a current sampling interval, a respective last signal pulse during the current sampling interval, a respective next-to-last signal pulse during the current sampling interval, and a respective total quantity of signal pulses generated by the first rotational position sensor during the current sampling interval coincident with determining a second angle of rotation associated with the second member based upon times corresponding to the end of the current sampling interval, a respective last signal pulse during the current sampling interval, a respective next-to-last signal pulse during the current sampling interval, and a respective total quantity of signal pulses generated by the second rotational position sensor during the current sampling interval;

determining a twist angle corresponding to a difference between the first and second angles of rotation; and calculating torque corresponding to the twist angle;

wherein determining the second angle of rotation comprises calculating each of the angles of rotation in accordance with:

$$\Phi_K = \Phi_{K-1} + [(\eta_I(k) + \eta_F(k) + N(k) - 1)/N_T]$$

wherein
$\Phi_K$ is the angle of rotation at the end of the current sampling interval;
$\beta_{K-1}$ is an angle of rotation at the end of an immediately prior sampling interval;
$N_T$ is a total quantity of teeth on a toothed element of the second rotational position sensor;
$N(k)$ is the total quantity of signal pulses occurring during the current sampling interval;

$$\eta_F(k) = \frac{T\_sample(k) - T\_9(k)}{T\_9(k) - T\_8(k)}$$

represents a fraction of a partial tooth rotation between the last signal pulse during the current sampling interval and the end of the current sampling interval, wherein T_sample(k) is the time at the end of the current sampling interval, T_9(k) is the time at which the last signal pulse during the current sampling interval occurs, and T_8(k) represents time at which the next-to-last signal pulse during the current sampling interval occurs; and
$\eta_I(k) = 1 - \eta_F(k-1)$ and represents a fraction of the partial tooth rotation between the beginning of the current sampling interval and a first signal pulse during the current sampling interval, wherein $\eta_F(k-1)$ represents a fraction of partial tooth rotation between a last signal pulse during the immediately prior sampling interval and an end of the immediately prior sampling interval.

8. A method for monitoring torque in a gear train including first and second rotationally coupled members each employing a respective rotational position sensor, comprising:
determining a first angle of rotation associated with the first member based upon times corresponding to an end of a current sampling interval, a respective last signal pulse during the current sampling interval, a respective next-to-last signal pulse during the current sampling interval, and a respective total quantity of signal pulses generated by the first rotational position sensor during the current sampling interval coincident with determining a second angle of rotation associated with the second member based upon times corresponding to the end of the current sampling interval, a respective last signal pulse during the current sampling interval, a respective next-to-last signal pulse during the current sampling interval, and a respective total quantity of signal pulses generated by the second rotational position sensor during the current sampling interval;
determining a twist angle corresponding to a difference between the first and second angles of rotation; and
calculating torque corresponding to the twist angle;
wherein determining each of said first and second angles of rotation comprises calculating each of the angles of rotation in accordance with:

$$\Phi_K = \Phi_{K-1} + [(\eta_I(k) + \eta_F(k) + N(k) - 1)/N_T]$$

wherein
$\Phi_K$ is the angle of rotation at the end of the sampling interval;
$\Phi_{K-1}$ is an angle of rotation at the end of an immediately prior sampling interval;
$N_T$ is a total quantity of teeth on a toothed element of the respective rotational position sensor;
$N(k)$ is the total quantity of signal pulses occurring during the sampling interval;

$$\eta_F(k) = \frac{T\_sample(k) - T\_9(k)}{T\_1(k+1) - T\_9(k)}$$

represents a fraction of a partial tooth rotation between the last signal pulse during the current sampling interval and the end of the current sampling interval, wherein T_sample(k) is the time at the end of the current sampling interval, T_9(k) is the time at which the last signal pulse during the current sampling interval occurs, and T_1(k+1) is the time at which a first signal pulse during an immediately subsequent sampling interval occurs; and
$\eta_I(k) = 1\eta_F(k-1)$ represents a fraction of the partial tooth rotation between the beginning of the current sampling interval and a first signal pulse during the current sampling interval, wherein $\eta_F(k-1)$ represents a fraction of a partial tooth rotation between a last signal pulse during the immediately prior sampling interval and an end of the immediately prior sampling interval.

9. A method for monitoring torque in a gear train including first and second rotationally coupled members each employing a respective rotational position sensor, comprising:
determining a first angle of rotation associated with the first member based upon times corresponding to an end of a current sampling interval, a respective last signal pulse during the current sampling interval, a respective next-to-last signal pulse during the current sampling interval, and a respective total quantity of signal pulses generated by the first rotational position sensor during the current sampling interval coincident with determining a second angle of rotation associated with the second member based upon times corresponding to the end of the current sampling interval, a respective last signal pulse during the current sampling interval, a respective next-to-last signal pulse during the current sampling interval, and a respective total quantity of signal pulses generated by the second rotational position sensor during the current sampling interval;
determining a twist angle corresponding to a difference between the first and second angles of rotation; and
calculating torque corresponding to the twist angle;
wherein determining each of said first and second coincident angles of rotation comprises calculating each of the angles of rotation in accordance with the following relationship:

$$\Phi_K = [\Phi_{Last}(k-1) + N(k)/N_T] + \eta'_F(k)/N_T$$

wherein
$\Phi_K$ is the angle of rotation at the end of the sampling interval;
$\Phi_{Last}(k-1)$ is an angle of rotation of a last signal pulse at the end of an immediately prior sampling interval;
$N_T$ is a total quantity of teeth on a toothed element of the respective rotational position sensor;

N(k) is the total quantity of signal pulses occurring during the current sampling interval; and $$\eta'_F(k) = \frac{T\_9(k) - T\_ref}{T\_9(k) - T\_8(k)}$$

represents a fraction of partial tooth rotation between a reference time T_ref and the last signal pulse during the current sampling interval, wherein T_9(k) is the time at which the last signal pulse during the current sampling interval occurs, and T_8(k) is time at which the next-to-last signal pulse during the current sampling interval occurs.

10. The method of claim 9, wherein the reference time is selected as an arbitrary reference time point comprising an arbitrary phase shift occurring between the last signal pulse during the current sampling interval and the next-to-last signal pulse during the current sampling interval generated by the respective rotational position sensor.

\* \* \* \* \*